June 11, 1957 A. M. LEVINE 2,795,650

COMPANDOR CONTROL SYSTEM

Filed April 23, 1952 3 Sheets-Sheet 1

INVENTOR
ARNOLD M. LEVINE
BY
ATTORNEY

INVENTOR
ARNOLD M. LEVINE
BY Percy P. Lantzy
ATTORNEY

June 11, 1957 A. M. LEVINE 2,795,650

COMPANDOR CONTROL SYSTEM

Filed April 23, 1952 3 Sheets-Sheet 3

INVENTOR
ARNOLD M. LEVINE
BY Percy P. Lantzy
ATTORNEY

United States Patent Office 2,795,650

Patented June 11, 1957

2,795,650

COMPANDOR CONTROL SYSTEM

Arnold M. Levine, River Edge, N. J., assignor to International Telephone and Telegraph Corporation, a corporation of Maryland Application April 23, 1952, Serial No. 283,857

17 Claims. (Cl. 179—15.6)

This invention relates to a compandor arrangement for use with a multichannel system and more particularly to a control system for a compandor arrangement employed in a pulse code modulation system.

PCM systems employing a compandor arrangement, wherein the modulator unit operates into a circuit having a compression characteristic for compression of audio or speech energy variation at the transmitter so as not to exceed the total transmitter energy range and the demodulator system operates into a circuit having an expansion characteristic complementary to the compression characteristic for providing an overall linearity in the PCM system, have become increasingly popular in the multi-channel communication field. Experimentation with such a system, however, has proven that the desired linearity in the system cannot be achieved unless the following conditions are met. First, the amplitude of the signal applied to the expandor must be of the proper size to fit within the expandor characteristic curve, and second, the signal applied to the expandor circuit must be properly centered with respect to the expander characteristic curve. Therefore, it is an object of this invention to provide a control system effective for any compandor arrangement which will satisfy the two above-mentioned conditions.

A feature of this invention is the employment of one channel in the multichannel system, perhaps the synchronizing channel, to carry a control signal in the form of a pure sine wave at audible frequency introduced at the audio modulator and detected after the multiplex demodulator separation to provide the activation necessary to operate the required control circuits.

Another feature of this invention is the employment of an odd harmonic filter and a phase discriminator responsive to odd harmonic distortion to control the gain of signals applied to the expandor. If the gain is inadequate, the sine wave control signal will appear at the output of the expandor carrying with it odd harmonic distortion, the phase of which will shift in accordance with the type and amount of distortion involved. The sine wave is selected at the output of the expandor by the multiplex demodulator and control channel detector, and then the odd harmonic is selected by a filter configuration and is applied to a phase discriminator. The output from the phase discriminator which may be plus, minus, or zero is then employed to control the gain of the means for reproducing linearity so as to fit the signals to the characteristic curve of the expandor.

Still another feature of this invention is the employment of an even harmonic filter and a phase discriminator responsive to even harmonic distortion to control the centering of the signals applied to the expandor with respect to the characteristic curves thereof. If the signal is off center, the sine wave control signal detected will carry with it an even harmonic distortion. This even harmonic is selected by the filter configuration and is applied to the discriminator whose output varies according to the phase thereof. The output therefrom is employed to center the signals applied to the expandor by a mechanical rotation of a potentiometer in the means for reproducing linearity or by an electronic means suitable for correcting an off-center phase error in the signals applied to the expandor. The phrase "center control" is employed herein to designate that voltage developed from the control signal to assure that the modulated signal applied to the expandor circuit is centered with respect to the expandor characteristic curve.

The above-mentioned and other features and objects of this invention will become more apparent by reference to the following description taken in conjunction with the accompanying drawings, in which.

Figure 1:
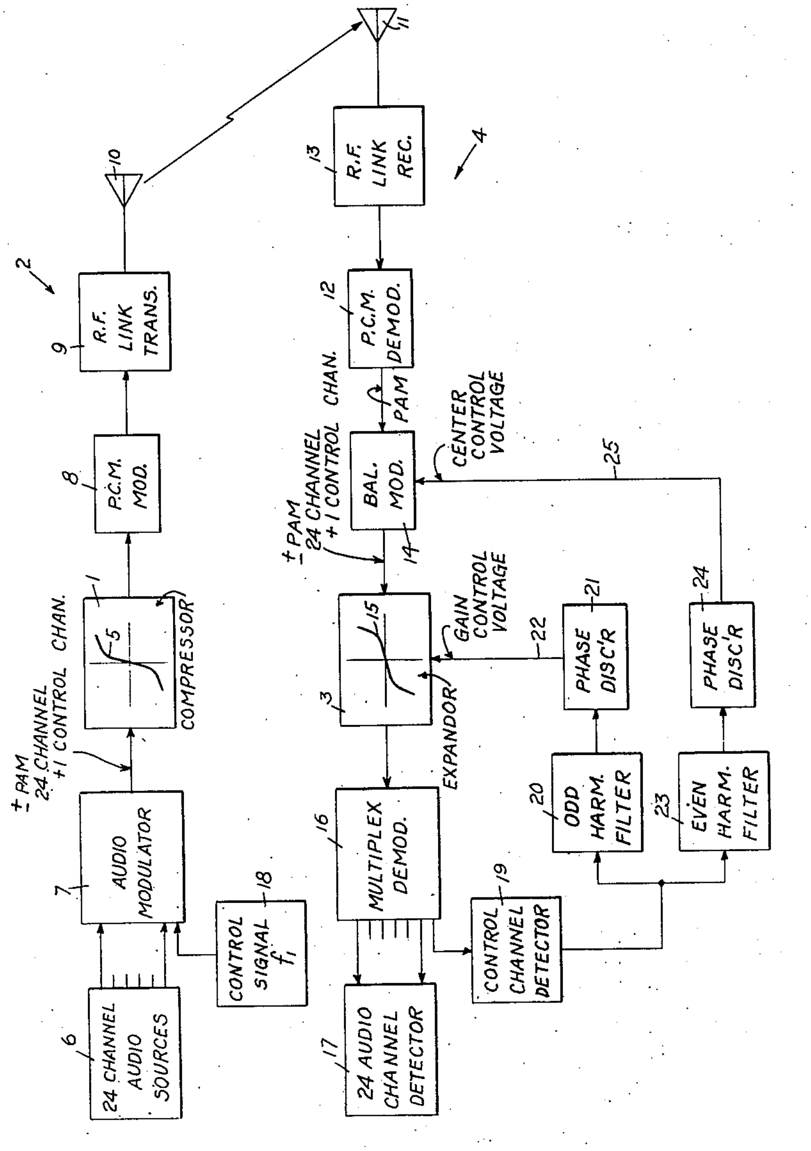
Fig. 1 illustrates a block diagram of a PCM system employing a compandor arrangement following the principles of this invention.

Referring to Fig. 1, a typical PCM multichannel system is illustrated in block form which employs a compandor arrangement consisting of the compressor unit 1 located in the PCM transmitter 2 and the expandor unit 3, forming a portion of the means reproducing linearity, located in the PCM receiver 4. With a PCM system, as shown herein utilizing a number of equal levels, say 64, 32 positive and 32 negative, the total transmitter range cannot be more than 30 db. The total range of speech energy coming from different speakers may vary as much as 30 db. In a telephone line an efficient volume control can compensate for the different levels of each speaker. However, the variations between consonant and vowel levels remain at approximately 30 db; but this does not include the variations of the voice intensity. Practically a total range of 55 db is reasonable. In order to maintain the speech voltages in the range of variation of the PCM transmitter, it is necessary to compress the speech energy variations at the transmitter 2.

Most of the time the speech energy is concentrated in a level of approximately 20 db under the peak energy, corresponding to a crest factor of 10 to 1. Then the general characteristic of the compressor 1 has to be such that most of the levels must be concentrated in the weakest part of the signal amplitude. One way to do this consists of increasing the amplitude of the successive quantizing levels in such a manner that the successive amplitudes form a geometrical progression. Therefore, compressor 1 introduces a predetermined distortion, substantially as shown in the characteristic curve 5, determined by the circuit arrangement contained therein. At the receiver 4 this distortion is corrected or compensated for by an expandor 3 having an inverse or complementary characteristic. The combination of compressor 1 and expandor 3 results in an overall linear input versus output characteristic provided distortion introduced by inadequate gain and improper centering of the signals applied to the expandor 3 is properly corrected for as hereinbelow described.

The general operation of the PCM system of Fig. 1 provides that the transmitter 2 have a plurality of separate audio sources 6 fed to the audio modulator 7 wherein the changes of audio amplitude are translated to changes of pulse amplitudes. These pulses are then interleaved for application to the compressor 1. In the embodiment shown there are 24 separate sources of audio applied to the modulator 7 to produce a 24 channel ±PAM signal which is applied to compressor 1 for compression of signal variations as required in the particular transmitter in accordance with the characteristic curve 5. The compressed PAM pulse train is then applied to the PCM modulator 8 for translation to a predetermined PCM pulse train and application therefrom to the R.-F. link transmitter 9 for radiation from antenna 10.

The radiated energy is received by antenna 11 and applied therefrom to the PCM demodulator 12 by the R.-F. link receiver 13. The operation of demodulator 12 is to translate the PCM pulse train into a positive-going PAM pulse train for application to the balanced modulator 14 which in turn produces a ±PAM signal. The PAM signal from the modulator 14 is then applied to the expandor 3 to remove the distortion introduced at compressor 1 by a circuit having a complementary characteristic with respect to the compressor 1 characteristic, as substantially shown by characteristic curve 15. Provided that no further distortion has been added by the radio link equipment, the overall linearity of the system will have been maintained and the channel pulses of the PAM signal will then be separated into their respective channels by multiplex demodulator 16 and applied to their appropriate audio detector 17 for faithful reproduction of the audio information introduced by sources 6.

However, as is understood by those skilled in the art, there is a certain amount of phase distortion introduced by the radio link equipment, such as the circuitry of transmitter 2 and receiver 4, as well as a certain amount of distortion introduced in the various other component circuits of the system. These phase distortion insertions will affect the reproduction efficiency of the balanced modulator 14 and the expandor 3 to an extent that is undesirable for faithful reproduction of the audio signals transmitted by this system.

Figure 5:
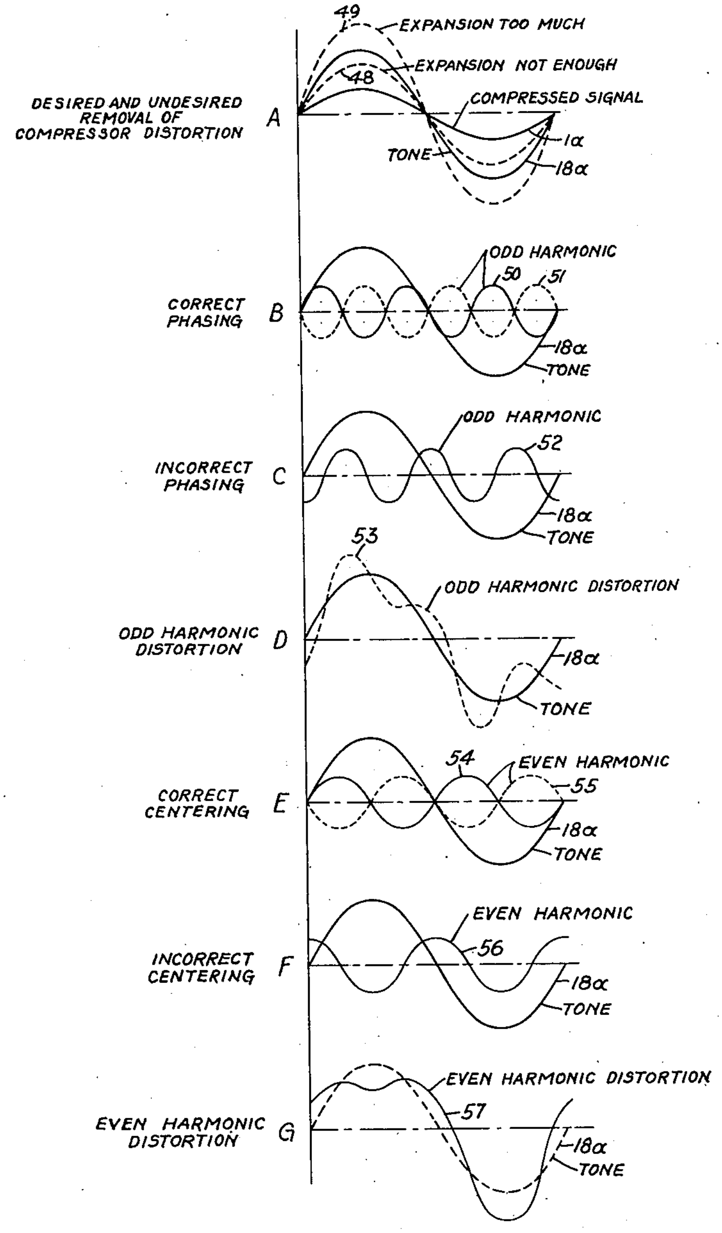
Fig. 5 indicates by means of the tone signal various conditions present in and corrected by the control circuit of Fig. 1.

To overcome these undesirable characteristics inherent in all such systems, it was discovered that the introduction of a pure sine wave tone, curve 18*a* of Fig. 5, from control signal source 18 to modulate a channel of the modulator 7, say the synchronizing channel of a multichannel system, makes it possible to utilize the distortion present in this control signal, characteristic of the distortion present in the multichannel signals, to regulate the centering of the PAM signals applied to the balanced modulator 14 and to control the gain of the expandor 3 to fit the PAM signal to the characteristic curve 15. Proper centering and gain control is achieved in the transmitter 4 by selection of the proper valued condensers in compressor 1 and by employment of the proper amount of voltage gain for the signals applied to the compressor 1, achieved in any manual or automatic means as may be desired.

The control signal from source 18 is utilized by employing a control channel detector 19 for detection of the sine wave tone and harmonic distortion thereof introduced at the expandor 15. The type of harmonic distortion present at the output of channel detector 19 depends upon the failure of the expandor to meet the required conditions. If the gain should be inadequate, odd harmonic distortion will be present, selection thereof being made by the odd harmonic filter 20 and the phase shift therein activating phase discriminator 21 to produce a plus, minus, or zero voltage output for application through conductor 22 to the expandor 4. The correcting voltage applied thereto alters the gain thereof in a manner to properly fit the PAM signals to the characteristic curve 15. If the signal is off center with reference to curve 15, the sine wave control signal or tone will have even harmonic distortion. This latter distortion is selected by even harmonic filters 23 and applied to phase discriminator 24. The output, plus, minus, or zero, of discriminator 24 is applied through conductor 25 to the balanced modulator 14 for properly centering the signals applied thereto.

In actuality the operation of the filters 20 and 23 and the discriminators 21 and 24 coincide in order that an imperfect centering condition produces odd and even harmonic output therefrom, thus providing cooperation therebetween to establish the proper gain and centering condition simultaneously. With a proper centering condition established, only the odd harmonic voltage output is present for maintenance of the proper gain condition, the voltage output from the even harmonic unit being zero.

Figure 2:
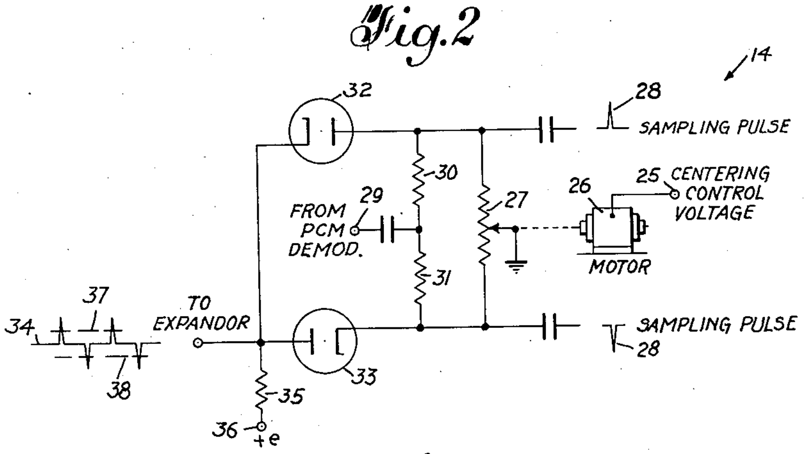
Fig. 2 illustrates a balanced modulator embodiment which may be employed in Fig. 1.

Referring to Fig. 2, an embodiment of the balanced modulator 14 is illustrated wherein the means for achieving and maintaining the desired centering condition includes a motor 26 activated by the centering control voltage on conductor 25 and a potentiometer 27 having mechanical linkage to the motor 26 for movement of the potentiometer 27. Through this mechanical arrangement the D.-C. level of the input signals to expandor 3 is shifted with reference to the zero of the characteristic curve 15, the shift of D.-C. level being dependent upon the control voltage present from discriminator 24.

The operation of balanced modulator 14 is to invert certain ones of the positive-going PAM pulses in the pulse train from the demodulator 12, the inverting operation being keyed or synchronized by sampling pulses 28 derived from the timing or synchronizing section of the demodulator 12. The pulses inverted will correspond with those pulses representing a negative polarity of the audio signal at the modulator 7 through the cooperation of the bias on modulator 14 and the sampling pulses 28. The positive-going pulses are applied through terminal 29 to a circuit comprising resistors 30 and 31 and the diodes 32 and 33 with the anode of diode 33 connected to the cathode of diode 32 such that only one diode will conduct at any given time. From the cathode-anode connection a positive and negative PAM pulse train 34 will be coupled to the expandor 3, with resistor 35 and the positive voltage at terminal 36 establishing the desired quiescent D.-C. level therefor. If this quiescent level does not correspond to the center of the characteristic curve 15, the action of the even harmonic filter 23 and discriminator 24 will be such as to properly change the position of potentiometer 27 through motor 26 to establish correspondence between the signal D.-C. level and the center of characteristic curve 15. The change of potentiometer 27 produces a change of conduction in diodes 32 and 33 to properly alter the D.-C. level of the PAM signal as herein described. With the proper value of potentiometer 27 and other circuit components, it would be possible to vary the D.-C. level of the signal 34 throughout the region indicated by dotted lines 37 and 38 to achieve the desired condition under a variety of off-center conditions.

Figure 3:
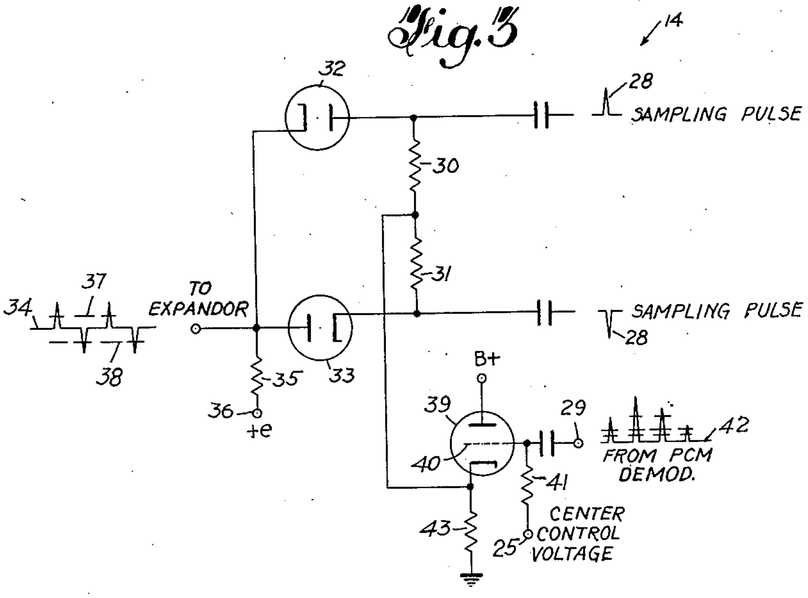
Fig. 3 illustrates another balanced modulator embodiment which may be employed in Fig. 1.

Referring to Fig. 3, a second embodiment of the balanced modulator 14 is illustrated comprising the identical basic components as included in Fig. 2. The difference therein is the means for applying the positive-going PAM signal from the demodulator 12 and the application and control of the center control voltage on conductor 25 from discriminator 24. If a centering error develops and is detected by the discriminator 24, a control voltage to properly correct the condition is applied through conductor 25 for application to grid 40 of the electron discharge device 39 through resistor 41. The action of the control voltage will be such as to increase or decrease the conduction of device 39 to return the signal 34 to the center of the characteristic curve 15. The signal 42 from demodulator 12 is also applied to grid 40. Therefore, these pulses will cause pulsed conduction of current through the cathode resistor 43, but the D.-C. level of these pulses will be altered dependent upon the action of the control voltage. The controlled pulse conduction through resistor 43 is coupled in a cathode follower manner to resistors 30 and 31 for operation of the modulator 14 in a manner substantially as described above for production of pulse train 34. Therefore, the proper change in the signal D.-C. level is accomplished in the device 39 by acting upon the pulse train or signal 42.

Although hereinabove two embodiments of the balanced modulator 14 have been described incorporating a means for utilizing the control voltage developed by the filter 23 and discriminator 24, these are not the only balanced modulator circuits that may be employed. Any known balanced modulator may be altered to utilize these control voltages substantially as hereinabove described.

Figure 4:
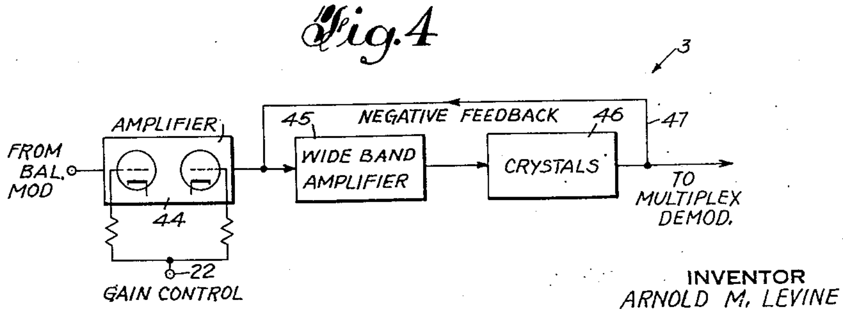
Fig. 4 illustrates a block diagram of an expandor circuit embodiment which may be employed in Fig. 1.

Referring to Fig. 4, an embodiment of the expandor 3 is illustrated utilizing the gain control voltage feature of this invention. Although only one specific embodiment is shown herein, it is to be understood that the gain control voltage may be utilized by any known expandor circuit to produce the desired gain condition as herein set forth.

This embodiment of the expandor 3 includes an amplifier 44 for replacing the voltage losses that have occurred in the prior circuitry of the receiver incorporating a connection to conductor 22 for utilization of the control voltage from filter 20 and discriminator 21 to fit the amplitude of the signals from the modulator 14 to the characteristic curve 15. The wide band amplifier 45, the pair of crystals 46, and a negative feedback path 47 are so arranged in a conventional manner that the expandor 3 will have a voltage characteristic substantially as shown in curve 15. Thus, the output signal from expandor 3 is coupled to the demodulator 16 with the distortion introduced at compressor 1 removed by the complementary characteristic of the expandor 3. To assure that the compressor 1 distortion is faithfully removed by the expandor 3, the gain of amplifier 44 is controlled from the discriminator 21 to exactly fit the signal to curve 15 by increasing or decreasing the conduction of the amplifier 44, as the situation may require.

Referring to Fig. 5, a number of curves are shown to indicate various conditions that may be present in the above-described system and those conditions that are desired. The signal used to show these conditions is the signal or tone present in the control channel and may be considered as being representative of the conditions present in the multichannel signals. Curve A indicates the tone 18*a* introduced by the control source 18 of Fig. 1 and which is desired at the output of the expandor 3. The compressed signal 1*a* is present at the output of compressor 1 and at the input to the expandor 3 where this compressed signal 1*a* is to be returned to the shape of the tone 18*a*, maintaining the desired overall linearity. If the expansion is not enough, signal 48 will be the resulting curve provided no distortion is introduced by expandor 3, while if the expansion is too much, signal 49 will be the resulting curve. Of course the desired condition is that tone 18*a* will be reproduced which may be substantially achieved by employing the control circuits herein described.

Curve B illustrates the tone 18*a* and its third harmonic 50 or 51 with the desired phase condition resulting in a zero output from the disscriminator 21 and indicating the desired gain condition present in the expandor 3. Curve C illustrates the tone 18*a* and its third harmonic 52 having an incorrect phase relation with respect to the original tone 18*a*. Therefore, an output from discriminator 21 will result in the proper sense, plus or minus, to return the expandor 3 to the desired gain condition indicated in curve B. Curve D illustrates the odd harmonic distortion 53 present at detector 19, as compared to the tone 18*a*, which would result in the sine wave tone 18*a* and would be substantially contained in the remaining multichannel signals at the output of expandor 3 due to the improper gain condition and phase error indicated in curve C.

Curve E illustrates the tone 18*a* and its resulting second harmonic signal 54 or 55 indicating a proper centering condition and resulting in a zero output from discriminator 24. Curve F illustrates the second harmonic 56 having an improper centering condition producing the proper correcting output voltage from discriminator 24 to return the output of expandor 3 to the proper centering condition indicated in curve E, and curve G illustrates the even harmonic distortion 57 present at detector 19 produced by the improper centering of curve F.

Therefore, as illustrated in curves D and F, the proper centering and gain conditions must be maintained to produce an overall linearity and faithful reproduction of the signals transmitted. As set forth herein, the control circuits of my invention make it possible to achieve these desired conditions with a minimum of effort and a minimum of additional circuits to be added to the existing PCM systems employing compandor arrangements.

While I have described above the principles of my invention in connection with specific apparatus, it is to be clearly understood that this description is made only by way of example and not as a limitation to the scope of my invention as set forth in the objects thereof and in the accompanying claims.

I claim:

1. A communication system comprising a transmitter having a compression device for compressing modulated signals according to a given compression characteristic curve and means for introducing a given signal into the signal transmission for compression similarly to that of said modulated signals; and a receiver for receiving said signal transmission, said receiver including an expansion device for expanding received signals according to an expansion characteristic curve substantially the complement of said compression characteristic curve, means coupled to the output of said expansion device responsive to odd and even harmonics of said given tone signal introduced by amplitude distortion during transmission to provide at least two different control signals, and means responsive to each of said control signals to compensate for the corresponding amplitude distortion of said modulated signals.

2. A communication system comprising a transmitter having a compression device for compressing modulated signals according to a given compression characteristic curve and means for introducing a given signal into the signal transmission for compression similarly to that of said modulated signals; and a receiver for receiving said signal transmission, said receiver having an expansion device for expanding received signals according to an expansion characteristic curve substantially the complement of said compression characteristic curve, means for detecting any odd or even harmonics added to said given signal by the circuitry of said transmitter and said receiver and means for utilizing said harmonic detection to compensate for corresponding distortion in said modulated signals, said means for detecting harmonics including an odd harmonic filter, an even harmonic filter, and a phase discriminator coupled to the output of each of such filters.

3. A communication system comprising a transmitter having a compression device for compressing modulated signals according to a given compression characteristic curve and means for introducing a given signal into the signal transmission for compression similarly to that of said modulated signals; and a receiver for receiving said signal transmission, said receiver having an expansion device for expanding received signals according to an expansion characteristic curve substantially the complement of said compression characteristic curve, means for detecting amplitude distortion in said given signal by detecting the harmonics added thereto, and means for utilizing said harmonic detection to compensate for corresponding distortion in said modulated signals, said means for detecting amplitude distortion in said given signal including a detector and means for separating odd and even harmonics contained in the amplitude distortion of said given signal.

4. A communication system according to claim 3, wherein the means for separating odd and even harmonics includes an odd harmonic filter, an even harmonic filter, and a phase discriminator coupled to the output of each of such filters.

5. A communication system according to claim 4, wherein the means for utilizing said harmonic detection includes a balanced modulator, means to apply to said balanced modulator a center control voltage varying in amplitude according to the phase condition of the even harmonics of said given signal, and means to apply to said expansion device a gain control voltage varying in amplitude according to the phase condition of the odd harmonics of said given signal.

6. A communication system according to claim 3, wherein the means for utilizing said harmonic detection includes a balanced modulator, means to apply to said balanced modulator a center control voltage varying in amplitude according to a characteristic of the even harmonics of said given signal, and means to apply to said expansion device a gain control voltage varying in amplitude according to a characteristic of the odd harmonics of said given signal.

7. A communication system according to claim 6, wherein the balanced modulator includes a pair of diodes, means to apply the modulated signals to said diodes, a source of bias voltage for said diodes, and means responsive to said center control voltage to control said biasing voltage.

8. A communication system according to claim 6, wherein the balanced modulator includes a pair of diodes, an electron discharge device, means to apply the output of said electron discharge device equally to said diodes, means to apply said modulated signals to said electron discharge device, and means to bias said electron discharge device in accordance with said center control voltage.

9. A communication system according to claim 3, wherein said transmitter includes means for modulating a plurality of signals to form a multichannel pulse train with said compression device being arranged to compress the amplitude of said pulses according to said compression characteristic curve.

10. A communication system according to claim 9, wherein the transmitter further includes means for translating the compressed pulse train to a pulse code modulated train and the receiver includes a pulse code demodulator for translating the pulse train into pulse amplitude modulated signals and means for applying the pulse amplitude modulated signals to said expansion device.

11. A receiver for receiving modulated signals compressed at the transmitter according to a given compression characteristic curve together with a given signal compressed similarly to that of the modulated signals comprising an expansion device for expanding the received signals according to an expansion characteristic curve substantially the complement of said compression characteristic curve, means coupled to the output of said expansion device responsive to odd and even harmonics of said given tone signal introduced by amplitude distortion during transmission to provide at least two different control signals, and means responsive to each of said control signals to compensate for the corresponding amplitude distortion of said modulated signals.

12. A receiver for receiving modulated signals compressed at the transmitter according to a given compression characteristic curve together with a given signal compressed similarly to that of the modulated signals comprising an expansion device for expanding the received signals according to an expansion characteristic curve substantially the complement of said compression characteristic curve, means for detecting amplitude distortion in said given signal by detecting the harmonics added thereto, and means for utilizing said harmonic detection to compensate for corresponding distortion in said signals, said means for detecting amplitude distortion in said given signal including a detector and means for separating odd and even harmonics contained in the distortion of said given signal.

13. A receiver according to claim 12, wherein the means for separating odd and even harmonics includes an odd harmonic filter, an even harmonic filter and a phase discriminator coupled to the output of each of such filters.

14. A receiver according to claim 13, wherein the means for utilizing said harmonic detection includes a balanced modulator, means to apply to said balanced modulator a center control voltage varying in amplitude according to the phase condition of the even harmonics of said given signal, and means to apply to said expansion device a gain control voltage varying in amplitude according to the phase condition of the odd harmonics of said given signal.

15. A receiver according to claim 12, wherein the means for utilizing said harmonic detection includes a balanced modulator, means to apply to said balanced modulator a center control voltage varying in amplitude according to a characteristic of the even harmonics of said given signal, and means to apply to said expansion device a gain control voltage varying in amplitude according to a characteristic of the odd harmonics of said given signal.

16. A receiver according to claim 15, wherein the balanced modulator includes a pair of diodes, means to apply the modulated signals to said diodes, a source of bias voltage for said diodes, and means responsive to said center control voltage to control said biasing voltage.

17. A receiver according to claim 15, wherein the balanced modulator includes a pair of diodes, an electron discharge device, means to apply the output of said electron discharge device equally to said diodes, means to apply said modulated signals to said electron discharge device, and means to bias said electron discharge device in accordance with said center control voltage.

References Cited in the file of this patent

UNITED STATES PATENTS

| | | |
|---|---|---|
| 1,743,132 | Green | Jan. 14, 1930 |
| 2,231,538 | Kreer | Feb. 11, 1941 |
| 2,248,757 | Herold | July 8, 1941 |
| 2,407,259 | Dickieson | Sept. 10, 1946 |
| 2,521,733 | Lesti | Sept. 12, 1950 |
| 2,580,421 | Guanella | Jan. 1, 1952 |
| 2,586,825 | Jacobsen | Feb. 26, 1952 |